United States Patent [19]

Freking

[11] Patent Number: 5,465,622
[45] Date of Patent: Nov. 14, 1995

[54] METHOD FOR DETERMINING DEPTH VALUES OF A BODY OF WATER

[75] Inventor: Benno Freking, Weyhe-Leeste, Germany

[73] Assignee: Atlas Elektronik GmbH, Bremen, Germany

[21] Appl. No.: 258,835

[22] Filed: Jun. 13, 1994

[30] Foreign Application Priority Data

Jun. 14, 1993 [DE] Germany ............... 43 19 607.1

[51] Int. Cl.$^6$ ............................................. G01N 9/24
[52] U.S. Cl. ................... 73/597; 73/602; 73/620
[58] Field of Search ............... 73/597, 594, 599, 73/602, 645, 620, 644; 364/560, 563; 367/104

[56] References Cited

U.S. PATENT DOCUMENTS

| | | | |
|---|---|---|---|
| 3,859,846 | 1/1975 | Asada et al. | 73/597 |
| 4,121,290 | 10/1978 | Allen et al. | 73/597 |
| 5,062,297 | 11/1991 | Hashimoto et al. | 73/597 |
| 5,170,667 | 12/1992 | Takeuchi et al. | 73/597 |

OTHER PUBLICATIONS

Müller/Kick, "BASIC–Programme für die angewandte Statistik", [Basic Program for Applied Statistics], 1985, R. Oldenbourg Verlag, pp. 77–89.

*Primary Examiner*—Hezron E. Williams
*Assistant Examiner*—Helen C. Kwok
*Attorney, Agent, or Firm*—Spencer, Frank & Schneider; Christopher H. Lynt

[57] ABSTRACT

For mapping and exploring bodies of water, fan depth finders are used that emit ultrasound pulses and receive-echo pulses in a number of tightly-bundled receiving sectors. Because the predominant number of receiving directions is oriented diagonally downward instead of straight down, these ultrasound pulses propagate on bent paths due to sound refraction. Sound refraction is caused by different sound velocity layers, the precise knowledge of which is necessary for determining an average sound velocity. The method of the present invention does not require a separate measuring probe to measure the sound velocity at different depths; rather, the average sound velocity is determined using a regression method based on the travel time measurements of the ultrasound pulses. In this method, first the floor profile that forms the basis of the measured travel times is determined with an assumed average sound velocity and compared with a floor profile model composed of partial functions modeled in a specific manner. Because a correction value for the average sound velocity can be determined from the partial functions, improved depth values of the floor profile can be determined iteratively with the measured travel times and the corrected sound velocity. A method of this type can advantageously be implemented on research and survey vessels for attaining the high precision required in surveying technology.

5 Claims, 2 Drawing Sheets

METHOD FOR DETERMINING DEPTH VALUES OF A BODY OF WATER

BACKGROUND OF THE INVENTION

The present invention relates to a method for determining depth values of a body of water using a fan depth finder of the type which emits ultrasonic pulses into the water, receives pulses which have been scattered or reflected by the floor of the body of water for a number of receiving directions, measures the travel times of the pulses, and determines respective depth values from the travel times.

Fan depth finders are used on research and survey vessels to map and explore bodies of water. An angular sector of up to 150° is evaluated and simultaneously measured by a fan depth finder, which is disposed beneath the vessel. Ultrasonic pulses are radiated in this angular sector and received by a transducer with a fan-shaped directional response in a number of individual, narrow sectors. The receiving transducer has tightly-bundled receiving directions. Because most of the receiving directions are oriented diagonally downward rather than vertically downward, some of the pulses that have been scattered or reflected at pulse-impingement or impact points on the floor of the body of water do not propagate linearly to the receiving transducer but instead travel to it along bent paths due to sound refraction. The cause of the bent sound propagation paths is the sound refraction caused by different sound velocity layers in the water. Hence, the actual impact point of the sound may deviate considerably from the apparent impact point because the bend cannot be determined linearly from the angle of incidence of the sound measured in the immediate vicinity of the receiving transducer. By also detecting the sound velocity in the different layers of the body of water, using (for example) a sound measuring probe lowered from the vessel, an average sound velocity can be determined that would result for linear propagation of a pulse from the impact points on the floor of the body of water to the transducer. A measuring procedure of this type for the average sound velocity is very costly for successive measurements of floor profiles of a body of water, because the vessel must slow its travel, if necessary to a dead stop.

SUMMARY OF THE INVENTION

It is therefore an object of the invention to improve the determination of depth values with fan depth finders and to increase the precision of the measurement of floor profiles of bodies of water.

This is accomplished, according to the invention, in that depth values $T(i)$ associated with respective receiving directions i of the receiving transducer of the fan depth finder or horizontal pulse impact distances $A(i)$ are supplied as input data to a regression calculator, in that coefficients $K_1$, $K_2$, and $K_3$ of a compensation function are calculated with the known method of linear regression, which function represents a model function of the profile of the floor of the body of water and approximates the depth values $T(i)$ with minimum errors, in that at least one of the calculated coefficients $K_3$ is a weighting factor for a partial function $x_3(i)$ of the compensation function, the partial function being dependent on the average velocity of sound in the water, and in that a corrected average sound velocity for a corrected depth value determination is determined from the partial function $x_3(i)$.

In the method of the invention, a series of pulse travel times is measured for each of the fanned-out receiving directions of the receiving transducer, from which the depth values $T(i)$ associated with each receiving direction i are calculated. This association can likewise be effected with respect to the horizontal distances $A(i)$ from a location directly under the vessel to the impact points of a pulse at different locations on the floor of the body of water. A crucial factor for correct determination of the depth values $T(i)$ and pulse impact distances $A(i)$ is a correctly determined average sound velocity in the water. Because it can be assumed on the one hand that the average sound velocity does not change or does not change significantly from receiving direction to receiving direction, and on the other hand that the floor of the body of water has a fundamentally level course, the floor profile can be approximated by a compensation polynomial that includes the receiving direction as a variable variant. The compensation function that optimally approximates the floor profile obtained with the measured depth values $T(i)$ is then determined with the averages of the linear regression. Through the suitable selection of the compensation polynomial, a correction value is obtained for the average sound velocity, so that it can be improved in this manner without additional measurement. Depth values $T(i)$ can then be determined from the measured travel times with considerably greater precision, with the sound velocity corrected in this manner.

A measuring method of this type is fast and reliable, and prevents any form of interruptions in travel for additional sensor measurements. It would even be possible to improve and correct measured depth values at the end of a measuring excursion, and thus later laboratory evaluation.

DESCRIPTION OF THE PREFERRED EMBODIMENTS

Figure 4:
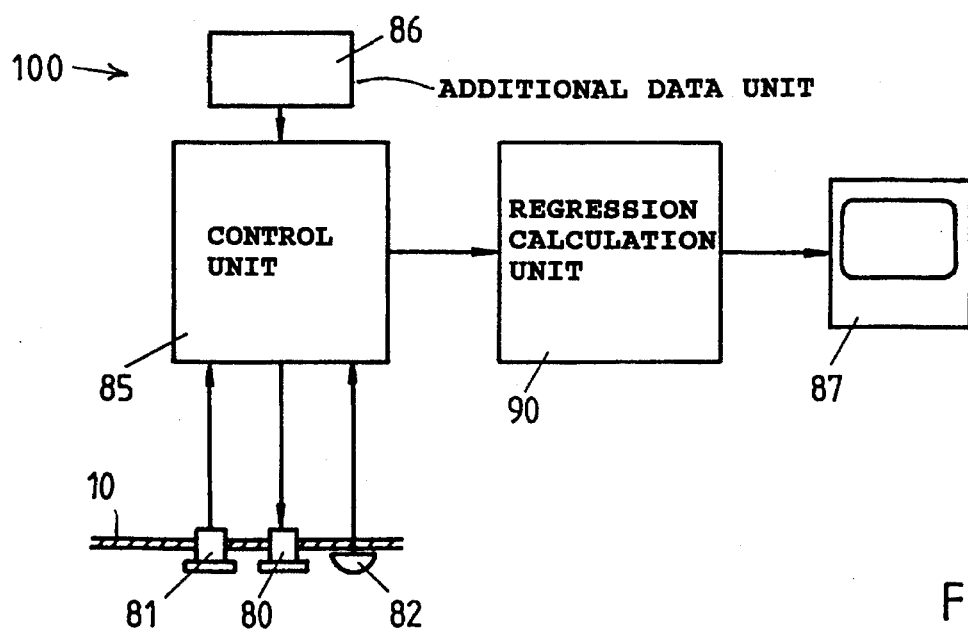
FIG. 4 is a circuit diagram of a fan depth finder.

FIG. 4 shows a fan depth finder 100 that can be used in the method for determining depth values in accordance with the present invention. A transmission transducer 80, a receiving transducer 81, and a sound velocity sensor 82 for measuring the sound velocity $c_k$ at the keel of a survey vessel 10 are connected to a control unit 85. Typically the control unit 85 also receives all of the navigation and vessel data (e.g., the vessel's position, bearing, and speed) from an additional data unit 86 in order to permit depth finder 100 to map the measured results. A regression calculation unit 90 is provided in which corrections in accordance with the present invention are assessed for determining the profile of the floor of the body of water. A data output unit such as a display 87 is connected to regression calculation unit 90.

Transmission transducer 80 emits ultrasonic pulses which radiate into the water and impinge against the floor of the body of water in a wide region beneath vessel 10. The ultrasonic waves are reflected or scattered from the floor to produce echo pulses which propagate upward from different positions on the floor. Receiving transducer 81 is highly directional and can distinguish between echo pulses it receives at different angles.

As was noted above in the "Background of the Invention" section, the body of water is typically stratified into layers which propagate sound at different velocities. This causes refraction which bends the paths of the ultrasonic waves, except for those that impinge against the floor of the body of water directly under the ship.

Figure 1:
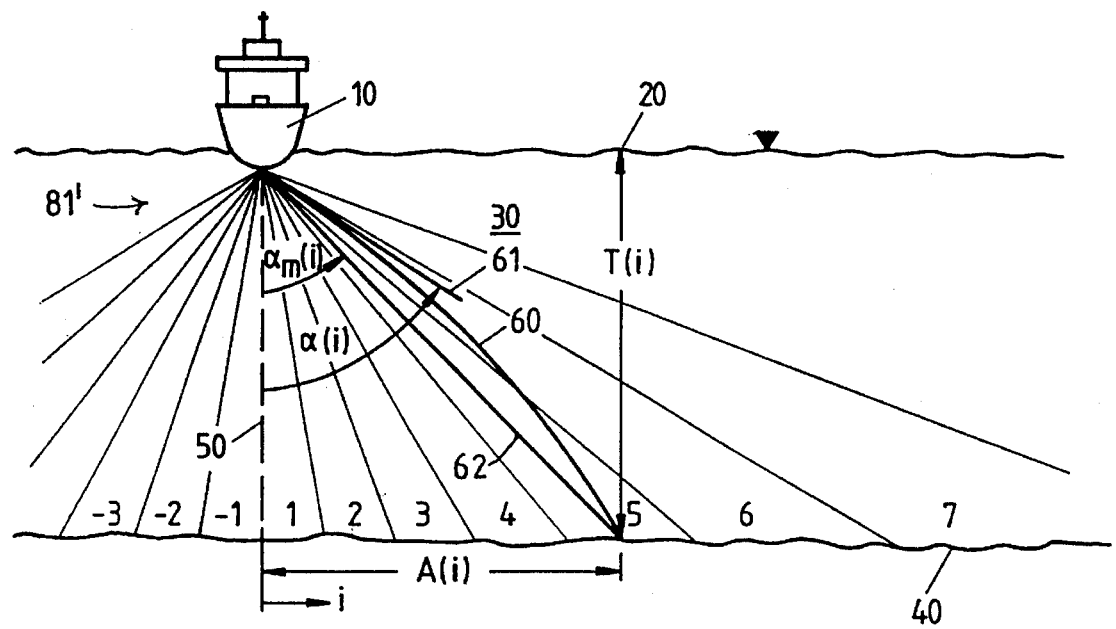
FIG. 1 is a schematic representation of the measuring geometry when the method of the present invention is employed.

For the purpose of describing the measuring geometry, FIG. 1 illustrates survey vessel 10 on the water surface 20 of a body of water 30. The depth values T(i) of the body of water 30 at the respective point of measurement are determined by the floor profile 40. The directional characteristics of receiving transducer 81 are illustrated as a receiving fan 81' which is principally characterized by the partially illustrated sectors. The individual sectors are indicated by numerical values for an index i. Sectors 1 through 7 are plotted to the right of vertical line 50; sectors −1 to −3 are plotted to the left. Sectors i are also referred to hereinafter as receiving directions i. The angular extent of the sectors shown in FIG. 1 is exaggerated to facilitate illustration, and in practice a larger number of narrower sectors would generally be used.

An original pulse which is radiated from survey vessel 10 and scattered or reflected by floor 40 in the region of receiving sector 5, for example, reaches the receiving transducer 81 on acoustic beam 60. The tangent 61 to acoustic beam 60 has an angle $\alpha(i)$ measured at the keel, where receiving transducer 81 is located, with respect to vertical line 50. Angle $\alpha(i)$ is the receiving angle, which can be measured or set at receiving transducer 81.

The receiving angle $\alpha(i)$ is corrected to an actual angle $\alpha_m(i)$ in the body of water below the keel using the ratio of sound velocity at the keel $c_k$ and the average sound velocity $c_m$ in the body of water. This permits the receiving angle $\alpha(i)$ to be associated with the corrected receiving direction, in this instance i=5. The relationship is presented below in Equation (1):

$$\frac{c_k}{c_{ma}} = \frac{\sin \alpha(i)}{\sin \alpha_m(i)} \quad (1)$$

Assuming an average sound velocity of $c_{ma}$, e.g. $c_{ma}$=1500 m/sec, the actual angle $\alpha_m(i)$ for each receiving direction i can be determined as $$\alpha_m(i) = \arcsin\left( \frac{c_{ma}}{c_k} \cdot \sin \alpha(i) \right) \quad (2)$$

From FIG. 1 it will be apparent that the length of acoustic beam 60 is approximately equal to the length of straight line 62. Furthermore, the travel time of a pulse, from vessel 10 to floor 40 and back to vessel 10, would be approximately the same. This permits the length of straight line 62 (the hypotenuse of a right triangle) to be determined by multiplying half of the round-trip travel time for a pulse by the average sound velocity $c_{ma}$. Accordingly, taking into consideration the measured travel time t(i) of a pulse for each receiving direction i, the depth T(i) can be approximated with the aid of Equation (3) below:

$$T(i) = c_{ma} \frac{t(i)}{2} \cos \alpha_m(i) \quad (3)$$

The pulse impact-point or impingement-point distance A(i) from the vertical line 50 can also be approximated with the aid of Equation (4) below:

$$A(i) = c_{ma} \frac{t(i)}{2} \sin \alpha_m(i) \quad (4)$$

Figure 2:
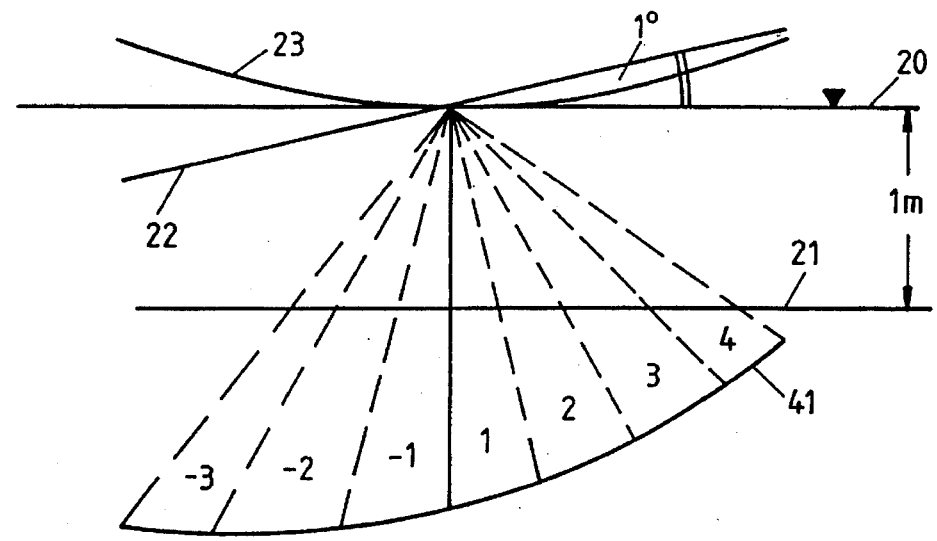
FIG. 2 is a sketch of a function that is used to model the profile of the floor of a body of water, and partial functions which are present in the model function.

In the present invention the profile of floor 40 is represented by a model function and multiple linear regression is employed to find the values of coefficients for partial functions of the model function. FIG. 2 illustrates the partial functions that comprise the model function required for multiple linear regression. Receiving direction i is the independent variable of the individual partial functions. The dependent variables of the partial functions represent depth values or depth differences.

The first partial function 21 extends at a constant spacing of, for example, 1 m from the water surface 20, and is described below by Equation (5):

$$x_1(i)=1 \quad (5)$$

In other words, depth values of one meter are defined and stored for all directions.

The second partial function 22 has a constant slope with respect to the water surface, the slope being 1° in this instance. Their values result from Equation (6) below:

$$x_2(i)=A(i) \cdot \tan 1° \quad (6)$$

The third partial function 23 has a bent course and takes into account the average sound velocity relevant for the sound beam path. Depth differences to be calculated in accordance with Equation (7) below are taken into account by partial function 23:

$$x_3(i)=T_n(i)-T(i) \quad (7)$$

The term $T_n$ in Equation (7) is defined below by Equation (8), and the term $\alpha_n(i)$ in Equation (8) is defined below in Equation (9):

$$T_n(i) = (c_{ma} - 1.0) \frac{t(i)}{2} \cos \alpha_n(i) \quad (8)$$

$$\alpha_n(i) = \arcsin[(c_{ma} - 1.0)/c_k \cdot \sin \alpha(i)] \quad (9)$$

Equation (7) means that, that to determine the depth difference $x_3(i)$, the previous depth T(i) is subtracted from a new depth value $T_n(i)$ that is recalculated in accordance with Equation (8) on the basis of an average sound velocity $c_{ma}$ reduced by 1 m/s. The changed, new receiving angle $\alpha_n(i)$ to be taken into account can be determined with Equation (9), which developed from Equation (2) with respect to the average sound velocity $c_{ma}$. The addition of these three partial functions $x_1(i)$, $x_2(i)$ and $x_3(i)$, after they have been multiplied respectively by coefficients $K_1$, $K_2$, $K_3$, provides the floor profile represented by curve 41, the model function. In addition, receiving sectors 1 through 4 and −1 through −3 are indicated in FIG. 2 for different receiving directions i.

Figure 3:
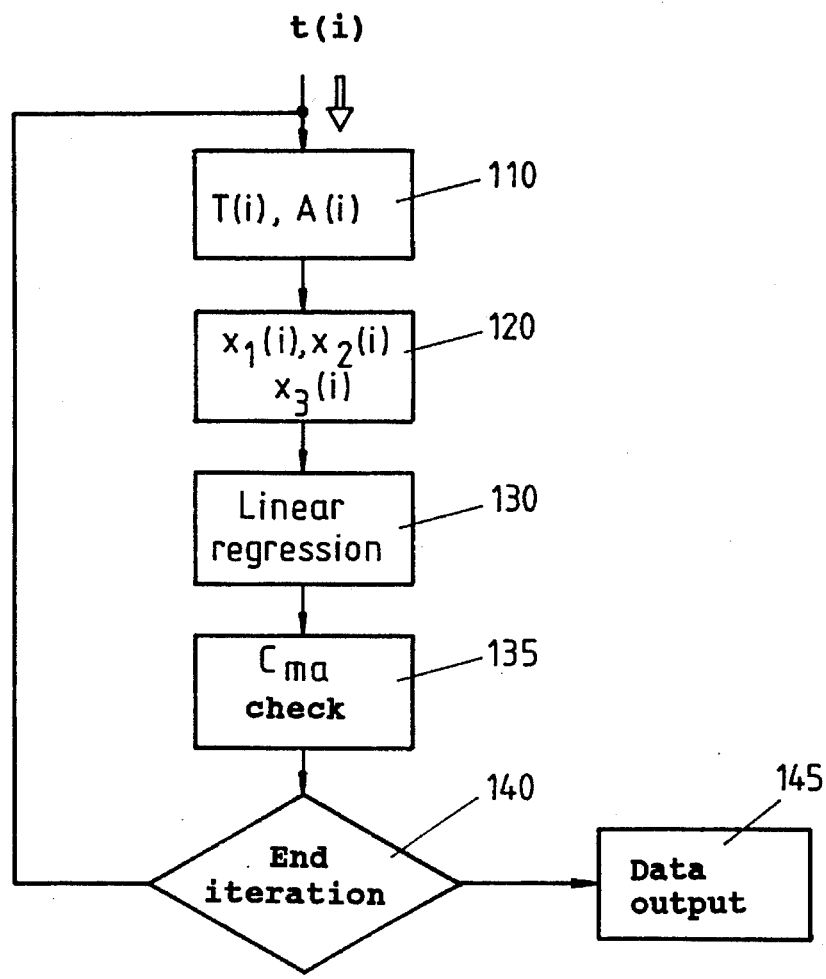
FIG. 3 is a flow chart for finding depth values in accordance with the present invention.

The method in accordance with the present invention will now be further described using the flow chart shown in FIG. 3.

With respect to an original pulse radiated by transmission transducer 80, the echo pulses reflected at the floor 40 of the body of water are received by receiving transducer 81 in each of 80 receiving sectors. For each receiving direction i, the pulse travel times t(i) are measured. A distance from the impingement or impact point on the ocean floor can be calculated from the travel time t(i) and average sound velocity $c_{ma}$; as shown in FIG. 1, the depth T(i) at the impact point and its distance A(i) from the vertical line 50 can be determined from this in a depth/distance calculation step 110 by employing Equations (3) and (4), respectively. Instead of using Equation (4), one can find A(i) by multiplying T(i) by the tangent of $\alpha_m(i)$. The partial functions $x_1(i)$, $x_2(i)$ and $x_3(i)$ used in the floor profile model for receiving directions i are then calculated in a model calculation step 120 in accordance with Equations (5) through (7), and then stored in storage regions of the regression calculation unit 90 for use during a linear regression step 130.

The stored data of these partial functions for all measured values form a system of equations whose parameters are determined such that the measured depth values T(i) are an optimum approximation. In this known method of multiple regression, Equation (10) below, which is obtained by adding partial functions $x_1(i)$ through $x_3(i)$ after they have been multiplied by coefficients $K_1$, $K_2$, $K_3$, is adapted to the number M of measured data, $$\hat{T}(i)=K_1 \cdot x_1(i)+K_2 x_2(i)+K_3 \cdot x_3(i) \tag{10}$$

and coefficients $K_1$, $K_2$, $K_3$ are determined such that the expression in Equation (11) below is minimized:

$$\sum_{m=1}^{M} (T_m(i)-T_m(i))^2 = \tag{11}$$

$$\sum_{m=1}^{M} (T_m(i)-(K_1 \cdot x_{1m}(i)+K_2 \cdot x_{2m}(i)+K_3 \cdot x_{3m}(i)))^2$$

This means that the depths determined with the model function are optimally adapted overall to a so-called measuring vector, that is, depth values T (i) determined from the travel time measurements t(i). In Equation (10), T(i) means the estimated value of T(i). In addition to the depth values, the variance and, if necessary, a correlation factor are calculated to provide a measure for the precision of the solutions. A method of this type is known, for example, from Müller/Kick, *Basic-Programme für die angewandte Statistik* [Basic Programs for Applied Statistics], 1985, R. Oldenbourg Verlag, p. 77 et seq.

A plausibility check, in which the validity of the determination of the sound velocity for temporally successive depth determinations is checked and extreme data of sound velocity $c_{ma}$ are excluded, is performed in step 135. It is then decided, in decision step 140, whether to end the calculation process and supply the results to display 87 in an output step 145, or to repeat it in a further iteration. The decision in step 140 may be based on whether the correlation factor or the variance is less than a predetermined value. If a further iteration is conducted, the changed sound velocity $c_{ma}$ determined in the regression using the partial function $x_3(i)$ is used to calculate an improved measured data vector or measuring vector. Coefficient $K_3$ is decisive for changing the average sound velocity $c_{ma}$, because $K_3$ multiplied with the reduction in the sound velocity executed in Equation (8), in this example 1 m/s, directly results in a correction value for determining the corrected, average sound velocity. From the measured travel times t(i), corrected depth values T(i) and impact distance values A(i) are determined in step 110 with the corrected, average sound velocity $c_{ma}$, and the processing procedure is re-executed iteratively in accordance with the flow chart shown in FIG. 3.

In multiple execution of the iteration process shown in FIG. 3, very high precision can be achieved for correcting the measurement. Corresponding simulations have shown, however, that two-time iteration produces the high precision required in surveying technology.

Transmission transducer 80 has a directional pattern that is nondirective transversely to the traveling direction of vessel 10 in order to expose the entire sector covered by the receiving fan 81' of receiving transducer 81 to ultrasonic waves. In the longitudinal direction of the vessel, transmission transducer 80 is tightly bundled in order to concentrate the sound radiation in the useful region.

As was noted above, the receiving sectors are preferably narrower than those shown in FIG. 1. In actual practice receiving fan 81' may be composed of approximately 2° wide receiving sectors that cover the region from the left to the right side of the vessel 10. The selection of the narrow receiving sectors i in the control unit 85 can be assured by using corresponding direction formers (not shown) with receiving transducer 81. As can be seen from FIG. 1, the impingement or impact points on the floor 40 of the body of water at different distances are associated with the receiving sectors i. Thus, different travel times t(i), which are measured by the fan depth finder 100, result for the scattered pulses, depending on the receiving angle.

The sensor 82 on the bottom of the vessel 10 measures the sound velocity $c_k$ in the immediate vicinity of receiving transducer 81 in order to determine the receiving angles $\alpha(i)$ set at transducer 81. Taking into account the geometrical relationships and the average sound velocity $c_{ma}$, depth values T(i) can be determined at the respective impact points, and can likewise be represented on display 87 as a measured floor profile.

These depth values T(i) are transferred to regression calculation unit 90. Regression calculation unit 90 first determines the three partial functions $x_1(i)$ through $x_3(i)$ in accordance with FIG. 2 for the floor profile model, and then unit 90 determines coefficients $K_1$, $K_2$, $K_3$, with which the model is adapted to the "measured" depth values T(i).

With each further evaluation of the input data, a new floor profile section is recorded, so a number of values results for the average sound velocity. Because these values cannot deviate greatly from one another, they are used during the plausibility check step 135 shown in FIG. 3; when significant deviations occur, these values are excluded, improved or replaced with average sound velocities determined from one or more additional iterations.

The direction formers mentioned above for generating the fan sweep 81' are part of the control unit 85 within the fan depth finder 100. Such a control unit 85 is available with the ATLAS HYDROSWEEP DS, a Hydrographic Multibeam Deep-Sea Sweeping Echosounder System, manufactured by ATLAS ELEKTRONIK GmbH, Bremen, Germany.

It will be understood that the above description of the present invention is susceptible to various modifications, changes, and adaptations, and the same are intended to be comprehended within the meaning and range of equivalents of the appended claims.

What is claimed is:

1. A method for determining depth values of a body of water using a fan depth finder, the depth finder including a transmitting transducer, a directional receiving transducer, a velocity sensor, and data processing means for processing depth value; said method comprising the steps of:

(a) emitting pulses into the water with said transmitting transducer;

(b) receiving, with said directional receiving transducer, echo pulses that have been scattered and reflected at a floor of the body of water for a number of predetermined receiving directions i;

(c) determining, with the data processing means, the travel times of the received pulses for different receiving directions i; the actual angle $\alpha_m(i)$ from an assumed, predetermined average sound velocity $c_{ma}$, receiving angle $\alpha(i)$ and the sound velocity at the keel $c_k$ which is measured with the velocity sensor; and pulse impact distances $A(i)$ from the average sound velocity $c_{ma}$, the travel times, and the actual angle $\alpha_m(i)$; and (d) determining, with the data processing means, depth values $T(i)$ from the travel times, the receiving directions, and an assumed, predetermined, average sound velocity in the water, step (d) comprising the sub-steps of (d-1) supplying at least one of said depth values $T(i)$ and said pulse impact distances $A(i)$ as input data to a regression calculator, the pulse impact distances $A(i)$ corresponding to horizontal distances between a position directly below the depth finder and different locations on the floor of the body of water when one of said pulses emitted during step (a) is scattered and reflected by the floor, (d-2) performing a multiple linear regression to obtain coefficients $K_1$, $K_2$, and $K_3$ of a compensation function, said compensation function being dependent on the average sound velocity in the water, said compensation function representing a model function of the floor profile of the body of water and approximating the depth values $T(i)$ with minimum errors, the coefficient $K_3$ being a weighting factor for a partial function $x_3(i)$ of the compensation function, and (d-3) determining a corrected average sound velocity in the water from the partial function $x_3(i)$.

2. The method of claim 1, wherein sub-steps (d-1) through (d-3) are conducted during a first iteration, and wherein step (d) further comprises the sub-steps of determining improved input data for the regression calculator from the corrected average sound velocity determined in step (d-3) and using the improved input data to conduct at least one further iteration.

3. The method of claim 2, wherein step (d) further comprises the sub-steps of determining at least one of a variance and a correlation factor for the improved input data, and repeating the iterations until said at least one of the variance and the correlation factor is less than a predetermined threshold value.

4. The method of claim 1, wherein the compensation function is a polynomial having partial functions $x_1$, $x_2$, and $x_3$ which are weighted respectively by the coefficients $K_1$, $K_2$, and $K_3$, wherein the partial function $x_1$ represents a constant depth for all of said receiving directions (i) or pulse impact distances $A(i)$, wherein the partial function $x_2$ represents a constant slope in the floor profile modeled by the compensation function, and wherein for each of said receiving directions (i) or pulse impact distances $A(i)$, the partial function $x_3$ represents different depths of the floor profile modeled by the compensation function due to a constant change in the average sound velocity.

5. The method of claim 4, wherein the constant depth represented by the partial function $x_1$ is one meter, the constant slope represented by the partial function $x_1$ is 1°, and the different depths represented by the partial function $x_3$ are due to a change of one meter per second in the average sound velocity.

* * * * *